United States Patent
Wedeven

[19]

[11] Patent Number: 5,584,360
[45] Date of Patent: Dec. 17, 1996

[54] METHOD FOR BROAD TEMPERATURE RANGE LUBRICATION WITH VAPORS

[76] Inventor: Lavern D. Wedeven, #1 Old Covered Bridge Rd., Newtown Square, Pa. 19073

[21] Appl. No.: 243,112

[22] Filed: May 16, 1994

[51] Int. Cl.⁶ ........................................ F01M 5/00
[52] U.S. Cl. .................. 184/6.22; 184/6.12; 184/6.26; 184/104.1
[58] Field of Search .................. 184/6.22, 6.26, 184/104.1, 109, 6.12, 6.11, 55.1, 57, 6.16, 7.4; 384/468, 473, 492, 527, 912; 92/154; 60/39.08; 415/110–112, 175–176; 74/467, 468; 475/159, 160

[56] References Cited

U.S. PATENT DOCUMENTS

| | | |
|---|---|---|
| 3,645,319 | 2/1972 | Pondelicek et al. . |
| 3,978,908 | 9/1976 | Klaus et al. . |
| 4,363,216 | 12/1982 | Bronicki .................. 184/6.22 |
| 4,592,930 | 6/1986 | Schmidt et al. . |
| 4,802,332 | 2/1989 | Beale . |
| 4,870,213 | 9/1989 | Inbasekaran et al. . |
| 4,955,424 | 9/1990 | Takehisa et al. . |
| 4,990,283 | 2/1991 | Visca et al. .................. 252/309 |
| 5,015,405 | 5/1991 | Kar et al. . |
| 5,017,022 | 5/1991 | Ruggles et al. . |
| 5,032,301 | 7/1991 | Pawloski et al. . |
| 5,055,009 | 10/1991 | Gutknecht .................. 417/407 |
| 5,137,422 | 8/1992 | Price et al. .................. 415/200 |
| 5,139,876 | 8/1992 | Graham et al. .................. 428/411.1 |
| 5,163,757 | 11/1992 | Graham .................. 184/104.1 |
| 5,327,998 | 7/1994 | Rosado et al. .................. 184/6.22 |
| 5,351,786 | 10/1994 | Graham et al. .................. 184/6.26 |

*Primary Examiner*—Edward K. Look
*Assistant Examiner*—Christopher Verdier
*Attorney, Agent, or Firm*—Robert Charles Beam, Esq.

[57] ABSTRACT

Conventional liquid lubrication requires a compromise between high temperature lubrication and low temperature flow. The major thrust of this invention is the preservation of the long life and reliable mechanism of elastohydrodynamic lubrication in the pursuit of elevated temperature lubrication. The mechanism of EHD lubrication is the primary source of lubrication for rolling element bearings, gears and other non-conforming contacting surfaces which must carry high loads over small areas of contact. The invention supplies the lubricant as a vapor which, upon condensation, provides an efficient replenishment of the inlet region to the elastohydrodynamic contact. For reasons of efficiency, the surfaces are encouraged to operate at elevated temperatures without cooling. Broad temperature range EHD lubrication with perfluoroalkylpolyether fluids provide full EHD lubrication up to 500° C. The enhanced temperature range, small fluid quantity and the supply of lubricant in a vapor environment eliminates the need for complex lubrication and cooling hardware.

20 Claims, 18 Drawing Sheets

Figure 3 H/SIGMA vs. temperature for three gas turbine engine oils (slow speed operation). Film thickness becomes less sensitive to temperature at elevated temperatures. Approximate locations of EHD, Ultra Thin EHD and Thermal Deposit regions.

Figure 9  Effect of temperature on the traction coefficient of a PFPE fluid for typical EHD contact conditions.

Figure 10 Vapor/condensate lubrication with a fixed supply (approx. 5 ml) of lubricant.

Figure 11 Traction showing transition from liquid to vapor/condensate lubrication.

Figure 12 Vapor/condensate lubrication with resupply of oil to heater/evaporator.

Figure 13  Vapor deposition lubrication with TCP to elevated temperature. Carrier gas — nitrogen Figure 14 Schematic of evaporator for vapor phase lubrication.

Figure 15 Continuous lubrication from 105 °C to 670 °C showing transition from V/C lubrication to V/D lubrication.

Figure 16 Five hour endurance test with PFPE V/C lubrication.

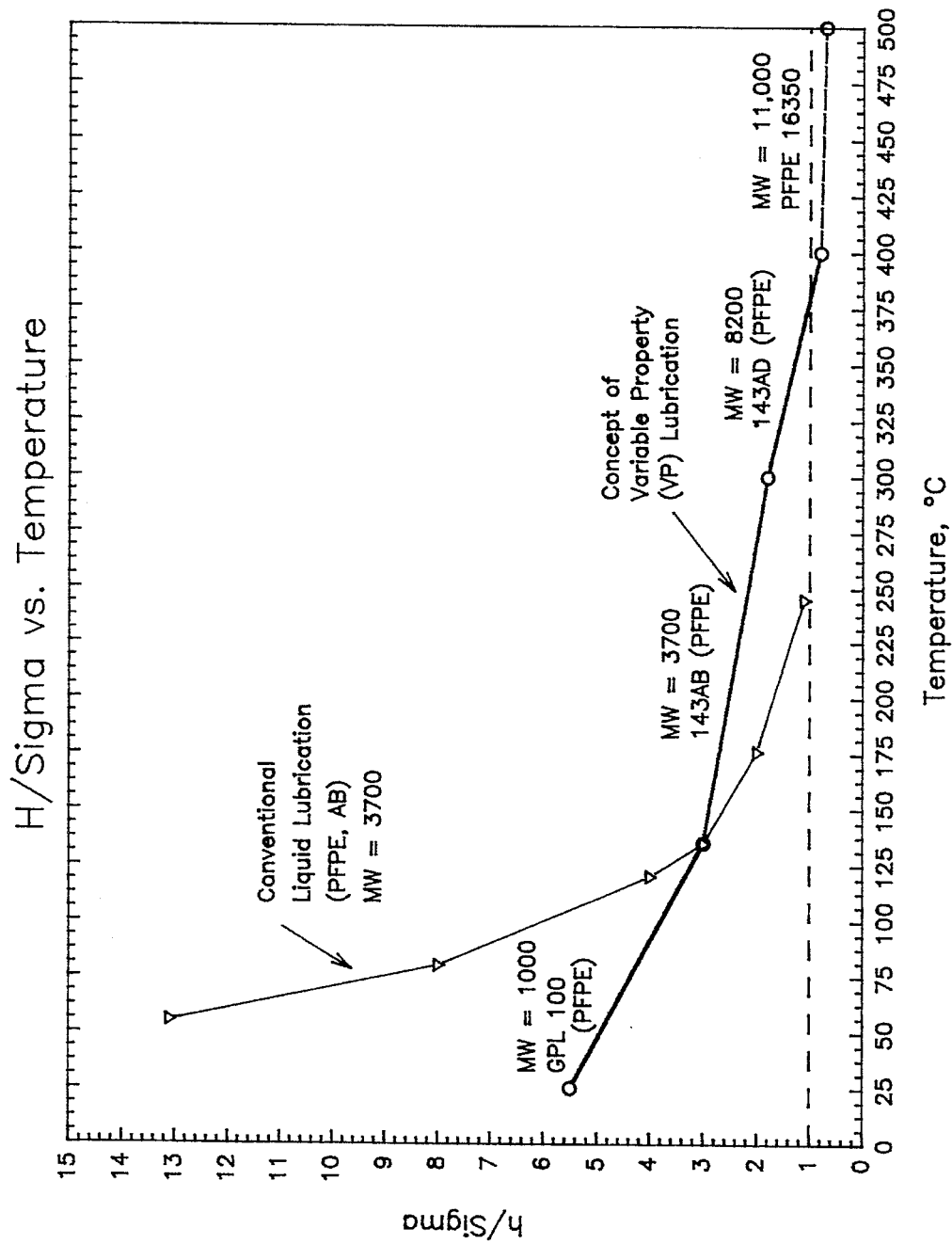
Figure 18  The concept of Variable Property (VP) lubrication, using vapor/condensation can extend EHD film thickness to elevated temperatures.

METHOD FOR BROAD TEMPERATURE RANGE LUBRICATION WITH VAPORS

BACKGROUND OF THE INVENTION

1. Field of the Invention

The present invention is in the area of lubrication of rolling/sliding surfaces, such as bearings and gears that may be required to operate over a large range of kinematic, stress and environmental conditions. Lubrication is conventionally supplied by liquid, solid, and sometimes gaseous materials, which provide a low shear strength film between the moving surfaces. The most reliable lubricating films are those generated by hydrodynamic (HD) or elastohydrodynamic (EHD) mechanisms, which separate the surfaces by a pressure buildup due to the pumping action of a fluid drawn into a convergent geometric region. The motion of a fluid drawn into a convergent zone by the moving surfaces generates sufficient pressure to cause a separation of the surfaces even under extremely high contact pressures. The separation of the surfaces is a function of surface velocities, load and the viscous properties of the lubricant. These parameters are quantified by hydrodynamic and elastohydrodynamic theory.

Conventionally, oils are supplied to the contacting surfaces as a liquid, in quantities generally sufficient for lubrication and cooling. Cooling is usually necessary because of temperature limitations, which are almost always related to the reduction in viscosity for lubrication or the thermal breakdown of the oil itself. To maintain proper cooling along with lubrication, oils are usually recirculated through a lubrication system with pumps, coolers, sumps, delivery lines and filters. One oil is used with selected viscous properties to cover a specific, but limited, range of temperatures.

This invention provides the process and a means of lubrication of surfaces over a broad temperature range with a small quantity of fluid that can be supplied with a simple system. The invention consists of the lubrication of surfaces with condensed vapors (vapor/condensation, or V/C lubrication) or with vapors that react with the surfaces (vapor/deposition, or V/D lubrication). The condensed vapors are sufficient in thickness to allow EHD film generation and even HD film generation. The amount of lubricant necessary to generate EHD lubricant films is very small, being only a "whisper" of condensate. Vapors that react with the surfaces (see U. S. Pat. 3,978,908 September 1976, E. E. Klaus) are used here as boundary films to supplement V/C lubrication. The preferred mechanism of lubrication is EHD, where the surfaces are completely separated with an oil film under high contact stress, so that the longest possible life of the surfaces can be achieved. The boundary film mechanism is called upon when the EHD mechanism can no longer be maintained.

The invention is most practical with fluids that can be vaporized without leaving breakdown deposits or having the potential for fire. Presently, the most useful fluids are the poly perfluoropolyalky ethers (PFPE) which do not have a flash or fire point and can be vaporized and condensed without solid breakdown products. Another advantage of PFPE's is their availability over a large range of molecular weights or viscosities. This allows a new form of lubrication called variable property (VP) lubrication. VP lubrication provides a condensate film on the surfaces, which increases in molecular weight, or viscosity, with temperature so that HD or EHD lubrication is sustained to an extended temperature level. Chemical additives, which are normally insoluble in PFPE's, can be supplied as vapors to provide boundary lubrication without the limitation of PFPE solubility.

2. Description of Prior Art

Most mechanical components are lubricated with systems which:

provide pressurized jets of oil;

drip feed oil;

provide oil from oil wicks; or provide oil from an oil sump into which the components dip as they rotate. These systems deliver the oil as a liquid which requires pumps and delivery hardware, except in the case of air-oil mist where misting hardware is required. In each application the selection of a single oil is made to best serve the intended application. Many applications of lubricated components, such as rolling element bearings or gears, require operation over a large range of temperatures and speeds, which go beyond the effective lubrication temperature limits of the oil. To resist this, the oil is used as a coolant to resist thermal breakdown and maintain sufficient viscous properties for lubrication. The lubrication system then becomes complicated with pumping and cooling hardware and large quantities of oil for cooling. High temperature operation within the thermal limits of the oil can be achieved by using high viscosity oils. This, however, usually compromises low temperature pumpability of the oil in the lubrication system. Generally, lubricant selection is based on a compromise between low and high temperature properties. The invention provides a lubrication means not limited by the viscous properties of one oil. The invention allows operation over a broad temperature range with a small quantity of lubricant and little or no cooling.

SUMMARY OF THE INVENTION

The method for providing broad temperature range lubrication with no cooling and a small amount of lubricant utilizes the evaporation of a fluid or solid which condenses on the bearing surfaces. The fluid is evaporated at a temperature higher than the surfaces to be lubricated. The lubricating fluid is one that can be evaporated without excessive thermal degradation or the formation of residual deposits. Lubrication can be provided over an extended temperature range by the use of fluids covering a range of molecular weights or distillation temperatures.

The vapor can be created by a heating source external or internal to the system being lubricated. The vapor provides an "environment" around the lubricated surfaces upon which condensation occurs at surface temperatures below the evaporation temperature of the fluid. Only a small quantity of fluid is necessary to maintain lubrication. There is no viscous liquid that must be pumped before lubrication begins. Upon startup, the residual films on the surfaces are sufficient to provide lubrication until the evaporator source is heated to provide replenishment vapor.

Optimal lubricant film thickness can be obtained over an extended temperature range by the use of fluids which evaporate and condense over a large temperature range. Low molecular weight PFPE fluids condense at a temperature below 100° C. (212° F.). High molecular weight PFPE fluids currently available condense at a temperature around 500° C. (932° F.).

Because of the extended temperature range provided by V/C lubrication, lubricants are not constrained by temperature. Bearing surfaces can seek their own equilibrium temperature. This can allow for more efficient operation due to higher operating temperatures. Air cooling for the protection of the bearing surfaces can be provided if necessary. Otherwise, natural heat conduction, radiation, and convection around the lubricated contact system can be used to dissipate the heat.

BRIEF DESCRIPTION OF THE DRAWINGS

An embodiment of the present invention is now described, by way of example, with reference to the accompanying drawings:

FIG. 18 illustrates the concept of variable property (VP) lubrication which enables an extension of the EHD lubrication mechanism to elevated temperatures (500 ° C.).

DETAILED DESCRIPTION OF THE PREFERRED EMBODIMENT

Figure 1:
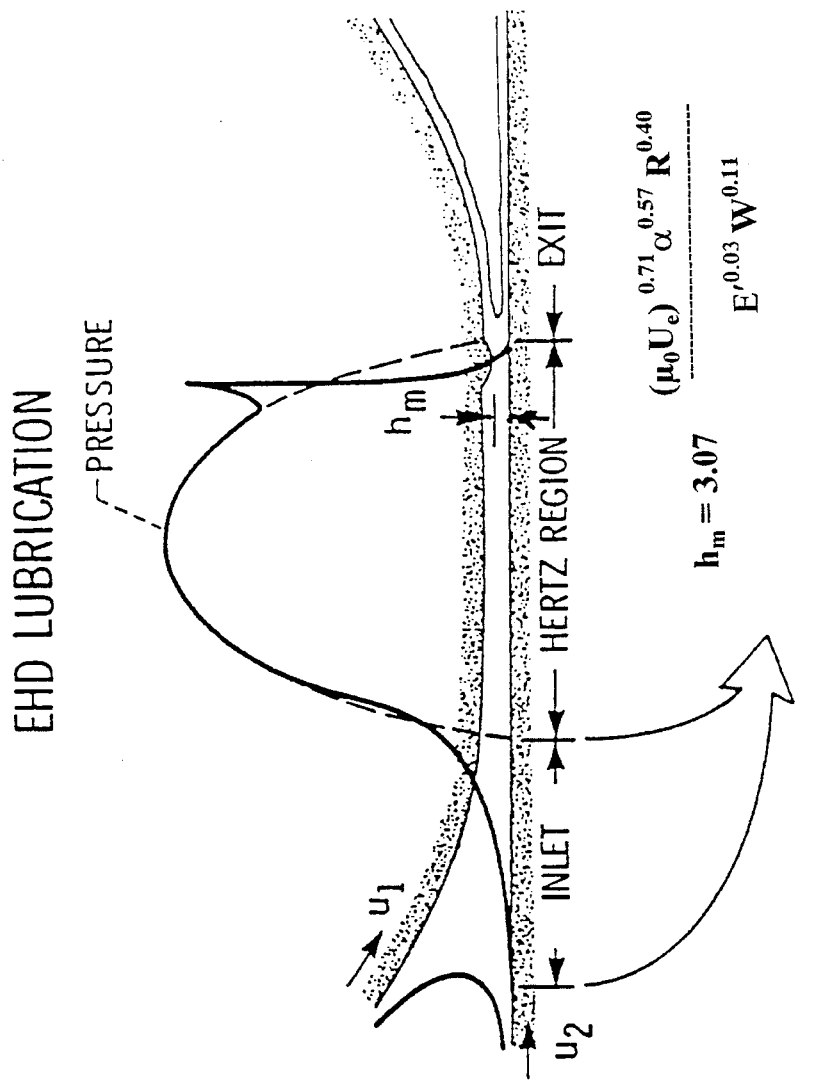
FIG. 1 describes the three regions of an elastohydrodynamic (EHD) contact and the governing theory for oil film thickness.

The major thrust of this invention is the preservation of the EHD mechanism of lubrication in the pursuit of elevated temperature lubrication. The mechanism of EHD lubrication is the primary source of lubrication for rolling element bearings, gears and other non-conforming contacting surfaces which must carry high loads over small areas of contact. The generation of an EHD film between the surfaces provides long life without wear, or at least a controlled amount of wear. An EHD contact can be divided into three regions as shown in FIG. 1: (1) an inlet region, the convergent nature of which causes the generation of pressure, (2) a Hertzian region, where the pressure is primarily due to the contact load which elastically deforms the surfaces, and (3) an exit region, where the oil film is discharged. Each of the three regions performs a particular function with regard to the EHD lubricating film. The inlet region pumps it up, the Hertzian region rides it and the exit region discharges it. The inlet region is the most important with regard to the generation of an EHD film. The thickness of the EHD film is primarily a function of operating conditions in the inlet region, the most important being the entraining velocity, curvature, and the lubricant properties involving viscositytemperature and pressure-viscosity characteristics. The relation between the controlling parameters is given in FIG. 1. The technical challenge for EHD lubrication at high temperature is to overcome the reduction in viscous properties, which can decrease in orders of magnitude as the temperature rises.

Figure 2:
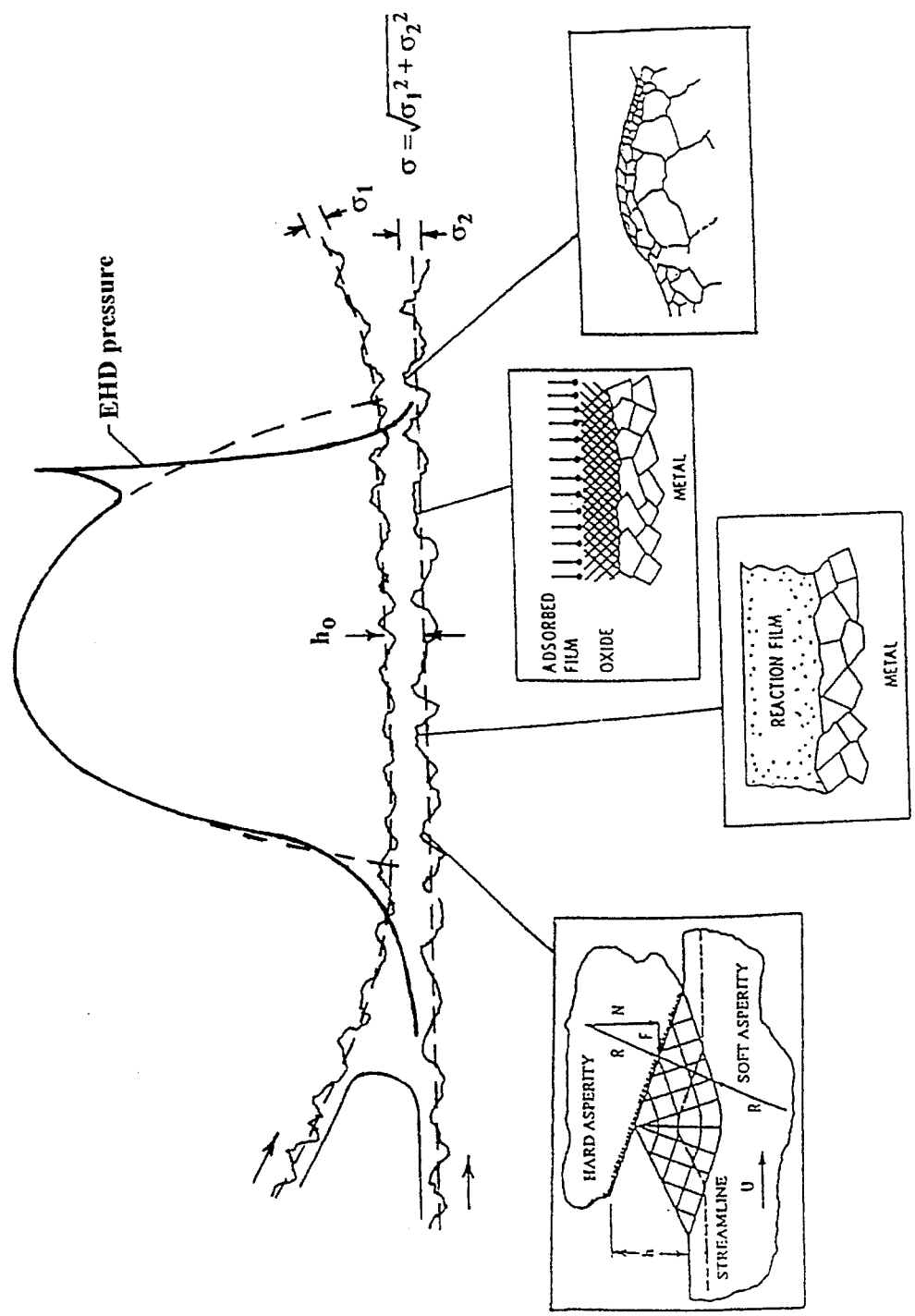
FIG. 2 describes the relative relationship between film thickness and surface roughness.
Figure 3:
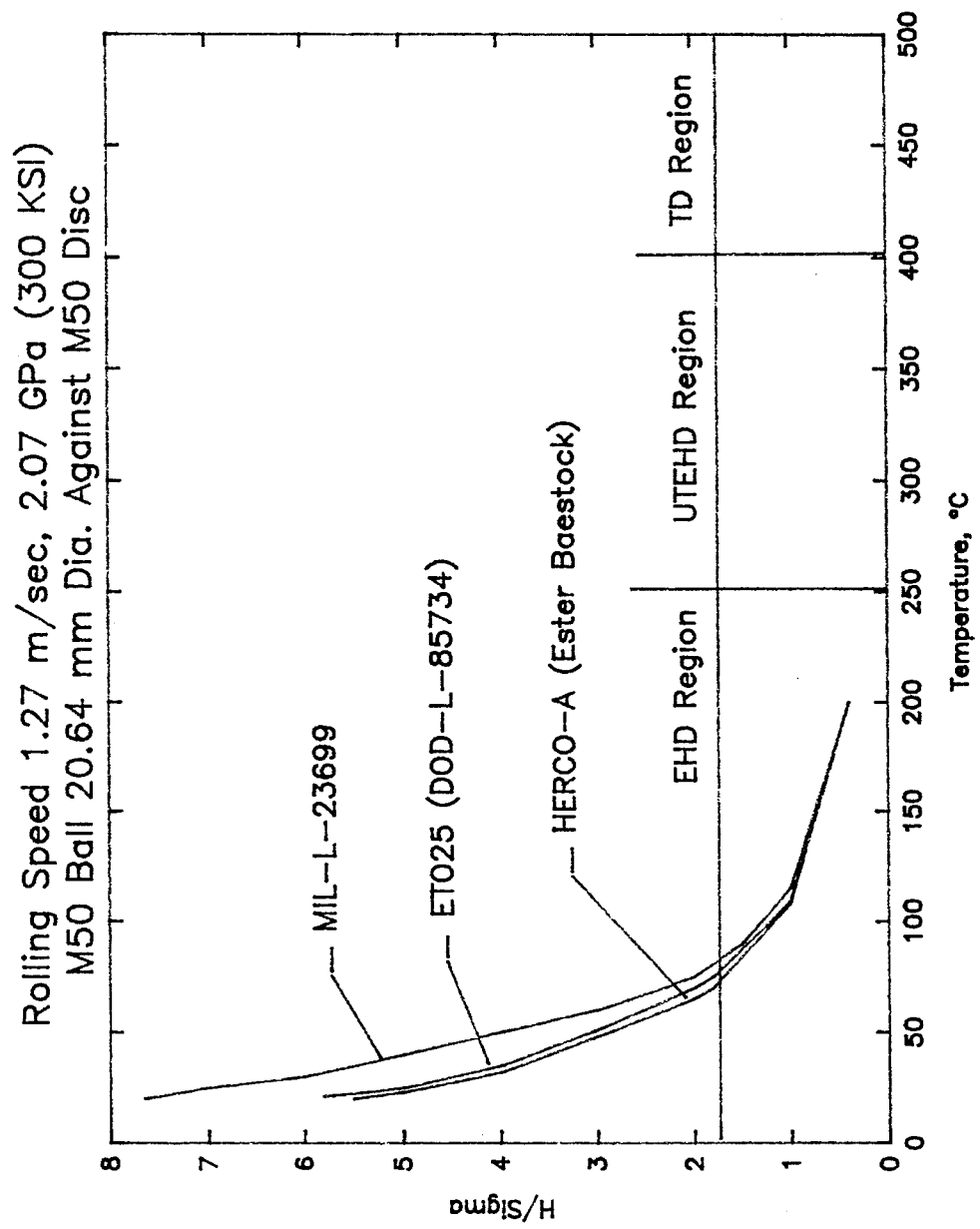
FIG. 3 describes the rapid drop in the film thickness/ surface roughness ratio with temperature, except at high temperature.

The performance of EHD lubrication is generally judged by the ratio of the EHD oil film thickness ($h_m$) to the combined surface roughness ($\sigma$) of the lubricated pair of surfaces, i.e. $h_m/\sigma$ as shown schematically in FIG. 2. As temperature increases, the $h_m/\sigma$ ratio decreases due to the reduction of lubricant viscosity ($\mu_o$) and pressure-viscosity coefficient ($\alpha$). For a selected set of operating conditions, the reduction of $h_m/\sigma$ with temperature is shown in FIG. 3 for a few selected oils. The temperatures of interest in the invention are up to and above 500 ° C., where viscosity and pressure-viscosity data are not available.

Suitable extrapolation of the curves in FIG. 3 reveals that the viscous film-forming properties of typical lubricants that cause a reduction in $h_m/\sigma$ become less sensitive to temperature at elevated temperatures, particularly approaching the range of 500° C. This means that, when the surface temperatures are high, the EHD mechanism of lubrication becomes more difficult to preserve by attempting to cool the surfaces. There is little gain in the $h_m/\sigma$ ratio at high temperatures even for large reductions in surface temperatures made by massive cooling and its associated hardware to accomplish it. A greater impact can be made by changing the viscous properties of the lubricant through, for example, its molecular weight. This is equivalent to utilizing a replacement lubricant that has a higher viscosity, which is an option that is generally not practical because of the need for low temperature flow at startup. To overcome this, automotive oils are developed with VI improvers to provide an oil with less sensitive viscosity-temperature characteristics. The VI improvement is generally not effective in EHD lubrication because the high shear causes shear thinning of the molecular structures that are used. In general, the performance of lubricants is constrained by the difficulties in maintaining sufficient viscosity at high temperature without sacrificing the viscosity requirements for low temperature pumpability. Since the lubricant is supplied as a vapor, this invention allows the viscosity to be changed with molecular weight for high temperature operation without having to be concerned about low temperature pumpability or cooling hardware.

Figure 4:
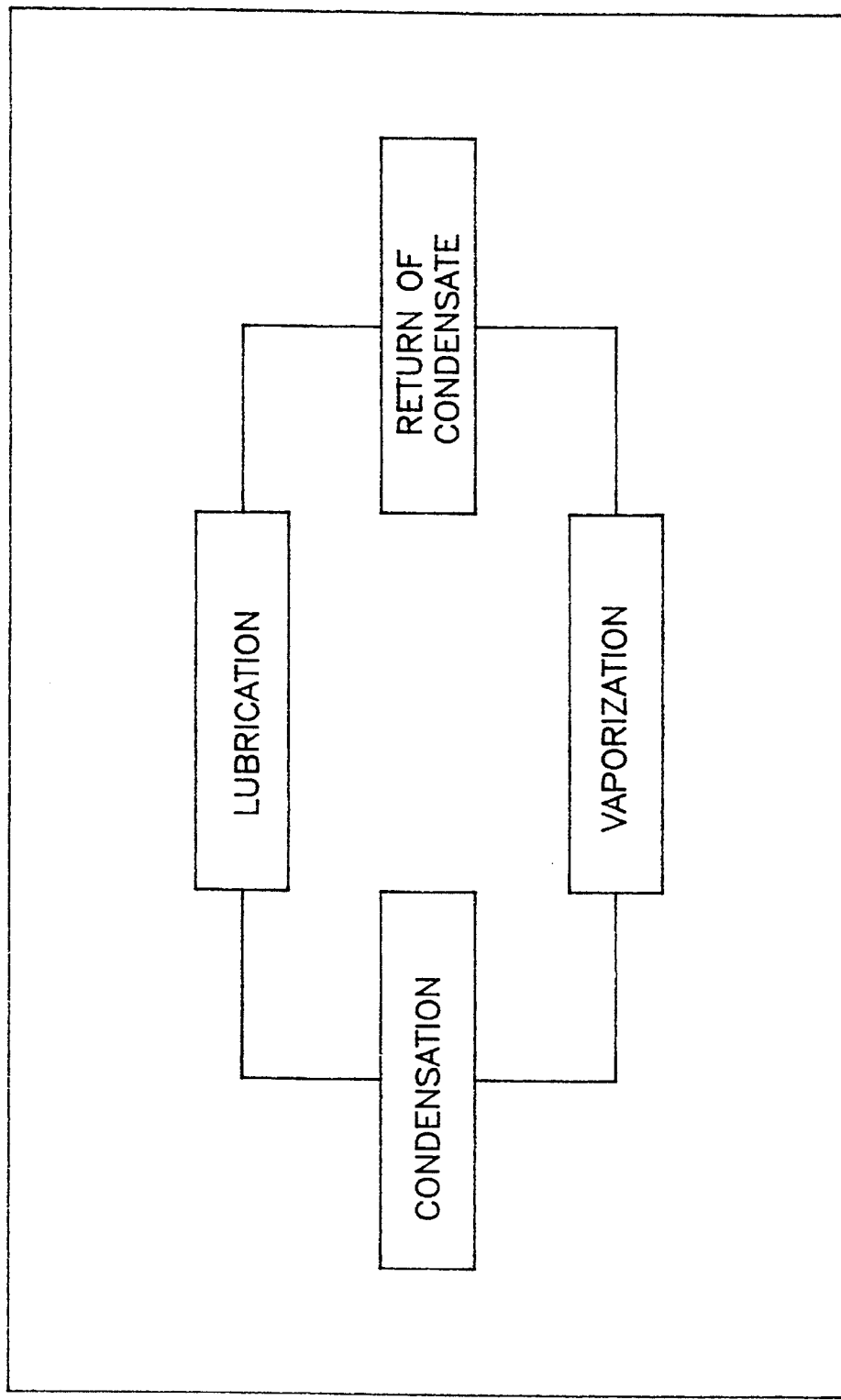
FIG. 4 is an illustration of the vapor/condensation process for lubrication.

The invention develops a method of vapor/condensation (V/C) lubrication shown schematically in FIG. 4. A vapor environment is created vaporizing a liquid or solid lubricant.

Figure 5:
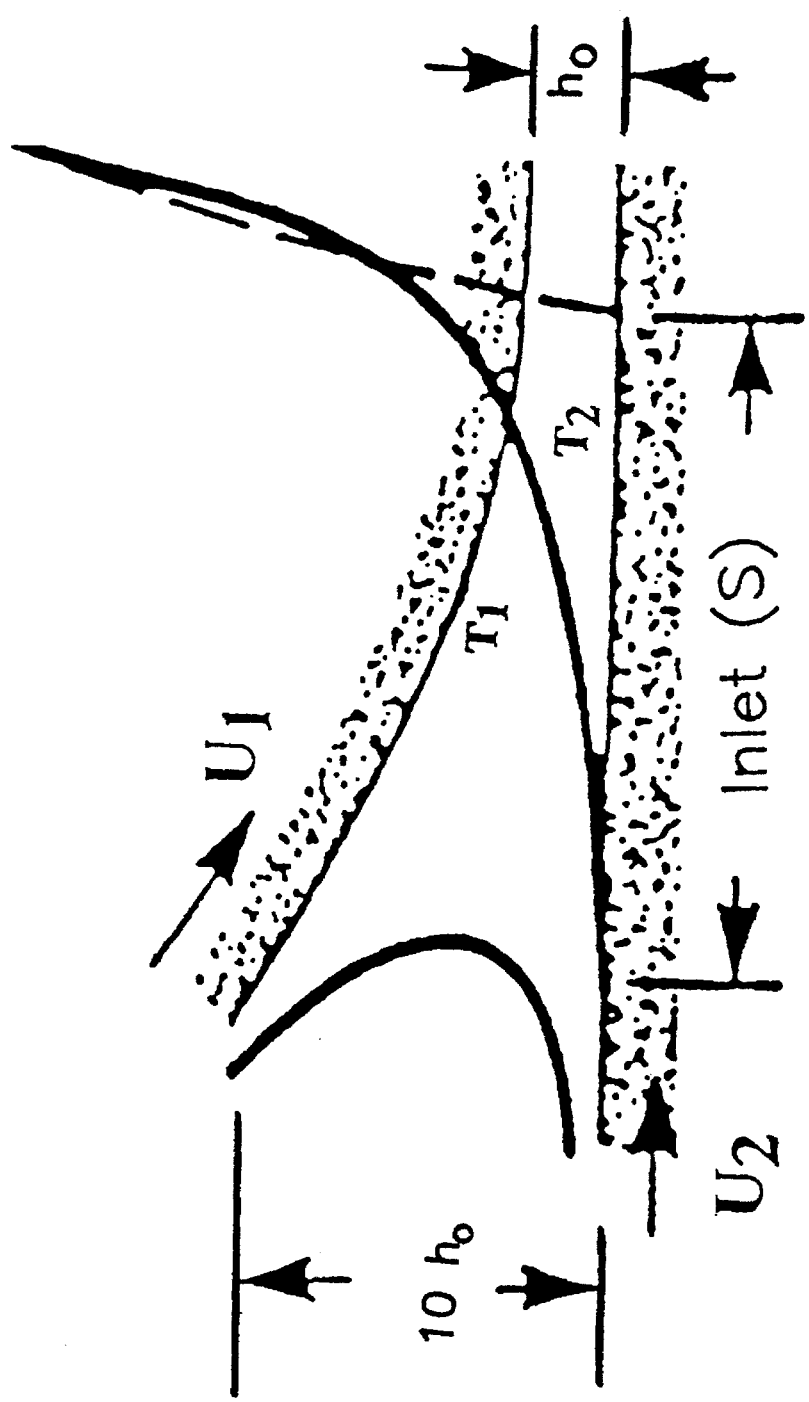
FIG. 5 captures the important inlet dimensions for an EHD lubricated contact.

The lubricant which condenses on the lower temperature surfaces is used for EHD lubrication. The thickness of the condensate film need only be a fraction of μm thick since the quantity of lubricant needed in the inlet region is very small. The dimensions of the inlet region are shown in FIG. 5. With a typical film thickness of 0.2 μm, the inlet needs only to be filled to a gap thickness of 2 μm. The actual thickness of the condensate needs only to be sufficient to keep the inlet region "flooded," or nearly flooded to prevent starvation. A starved EHD film, which is defined as a film that is thinner than its flooded condition, is still functional. As shown in FIG. 5, its thickness is diminished by the location of the inlet boundary (S). Most of the lubricant in the inlet region is recirculated within the inlet region. The gap at the nip of the Hertzian region will control the lubricant flow that actually goes through the contact. Because of this restriction in flow, the EHD contact pushes its inlet reservoir of lubricant in the direction of its travel. If there is no loss of lubricant between the exit and the inlet, the thickness of the condensate on each surface need only be $\frac{1}{2}h_o$, or 0.1 μm thick. The condensate film need only to replenish what is depleted from the inlet region during operation. With sufficiently slow speeds and time for backflow into the running track, no replenishment may be needed. Most applications need some degree of replenishment.

If lubricant is not needed for cooling, only a small quantity is needed for EHD lubrication. The delivery of the lubricant into the narrow convergent region, being of practical importance, is aided by the molecular transport mechanisms with a vapor environment. The filling of the inlet gap, beyond the distance S for a flooded EHD film, diminishes performance because of additional viscous shear, which increases the temperature of the lubricant in the inlet region and causes an increase in rolling friction. The most efficient EHD lubricated contact is one which provides a sufficient film thickness, be it starved or flooded, to separate the surfaces so that $h_m/\sigma$ is small. A condensate film provides a thin uniform coverage of the surfaces. Residual condensate that becomes too thick will form droplets which can return to the vaporizer for recirculation as shown schematically in FIG. 4. Having described the general concept of V/C lubrication and its practical features in connection with the EHD mechanism of lubrication, the detailed embodiment continues with a preferred embodiment utilizing perfluoroalkylpolyethers (PFPE's) as a lubricant. Other high temperature lubricants (mineral oils and other synthetics fluids such as poly phenyl ethers and synthetic hydrocarbons), including solids, can be used. The preferred embodiment with PFPE's is based on their ability to be vaporized: (1) at high temperatures (in the range of 350° C.) without thermal or oxidative breakdown, (2) without solid decomposition products at temperatures above their decomposition temperature, (3) without concern for fire since they have no auto ignition temperature, and (4) with condensation temperatures over a large range because of their availability over a large molecular weight range.

Figure 6:
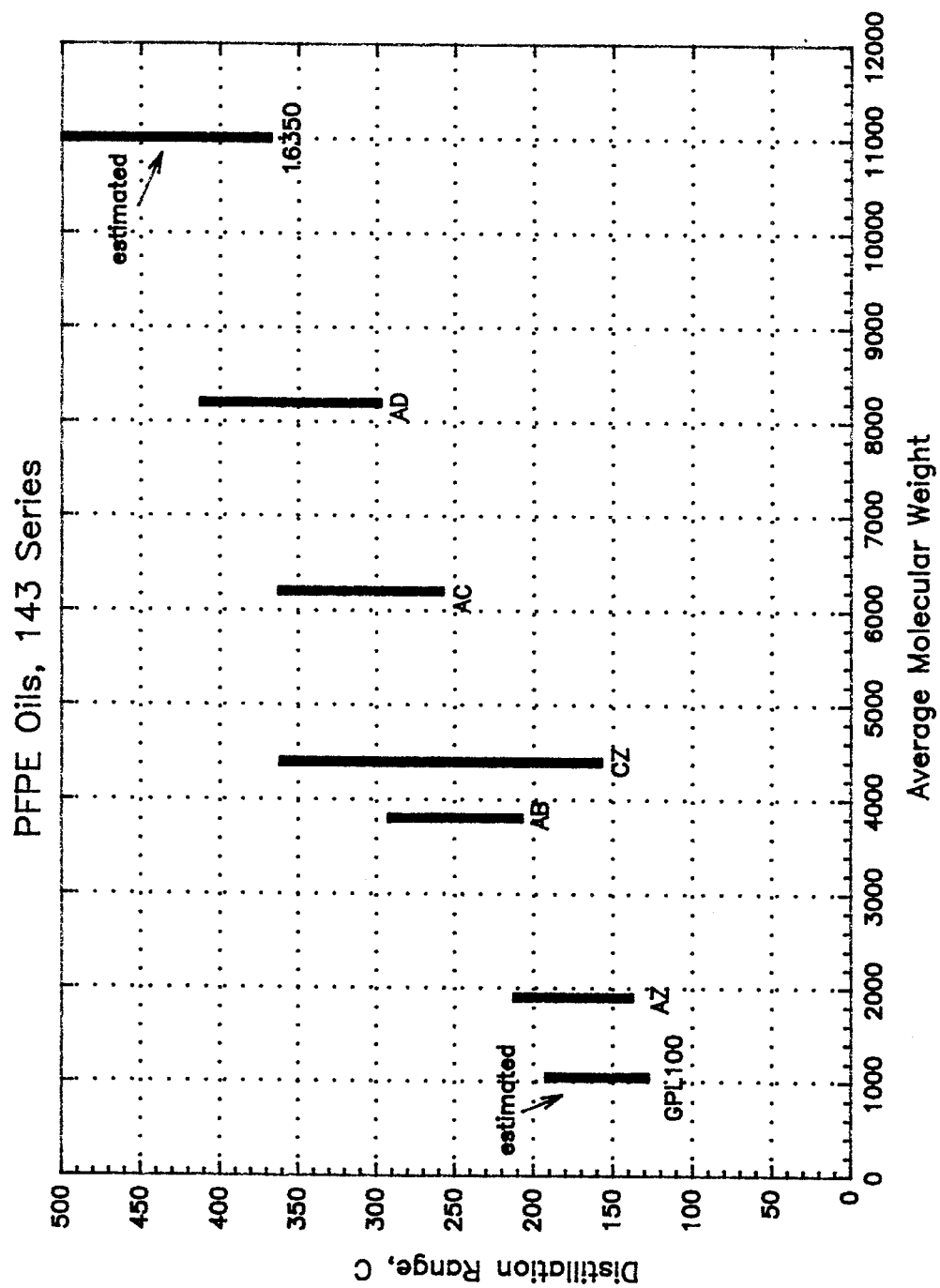
FIG. 6 is a distillation chart for PFPE fluids.
Figure 7:
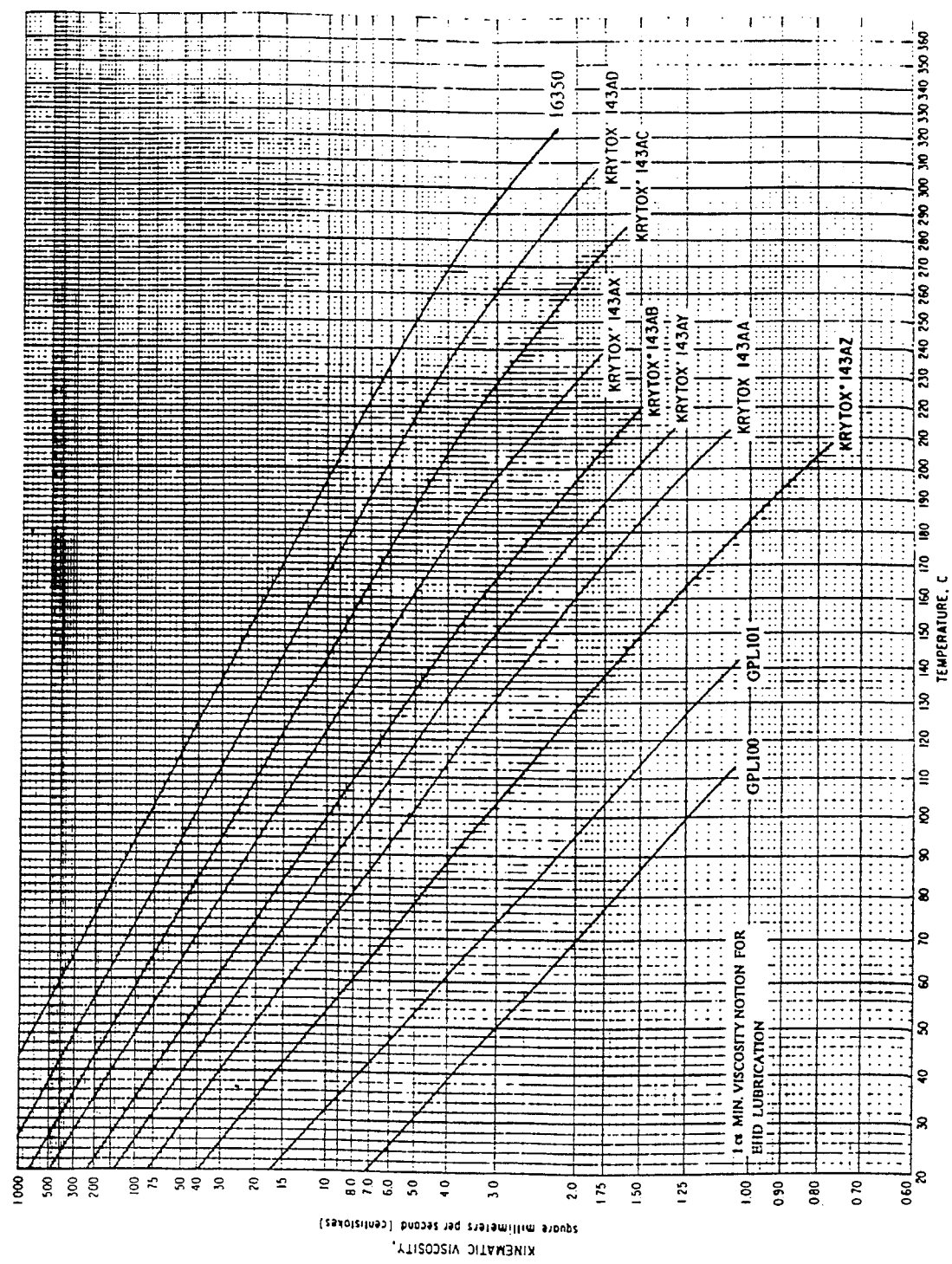
FIG. 7 illustrates the viscosity-temperature characteristics of PFPE fluids.

The distillation or vaporization temperatures of PFPE's with molecular weights ranging from 1100 to 11,000 are shown in FIG. 6. The temperatures for vaporization of the individual fluids range from 150° C. to 500° C. The viscosity vs temperature properties are shown in FIG. 7.

The characteristics of the preferred embodiment is developed with an a single tribological test device (see FIG. 8) that simulates the rolling/sliding kinematics and EHD contact conditions found, for example, in rolling element bearings and gears. The tribological contact used for simulation consists of a contact generated between a ball and disc test specimens which operate within a heated chamber. The vaporizer is a heater located under the test specimens. It serves to heat the test specimens as well as a vapor generator. A heater above the test specimens is used to control the chamber temperature. The lubricant to be vaporized is place on the bottom heater. The vaporizer can be resupplied with lubricant with a external feed tube if necessary. Liquid lubricant can drip feed onto the specimens through a hole in the upper heater.

Figure 9:
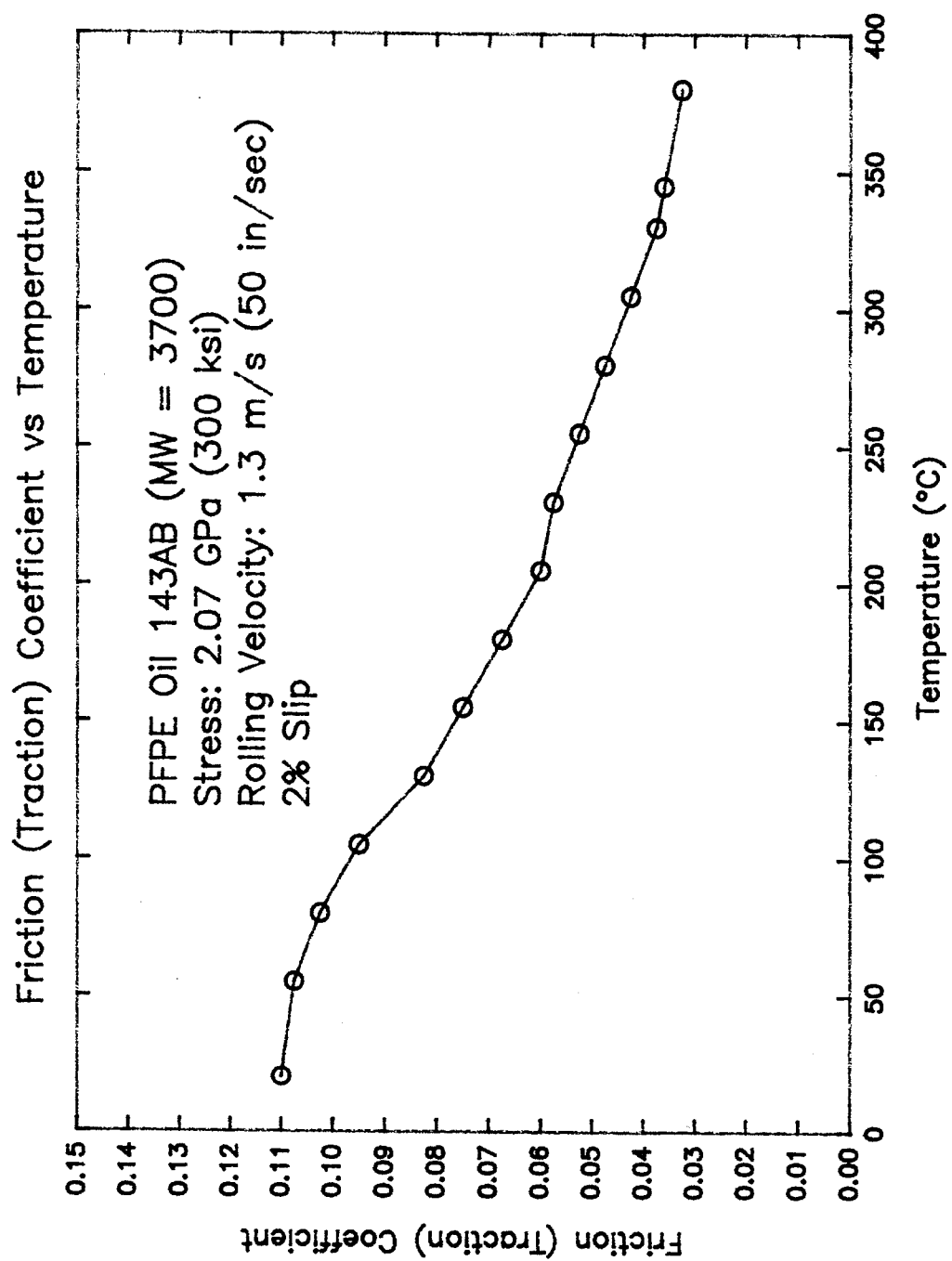
FIG. 9 shows the dependence of traction coefficient on temperature.
Figure 10:
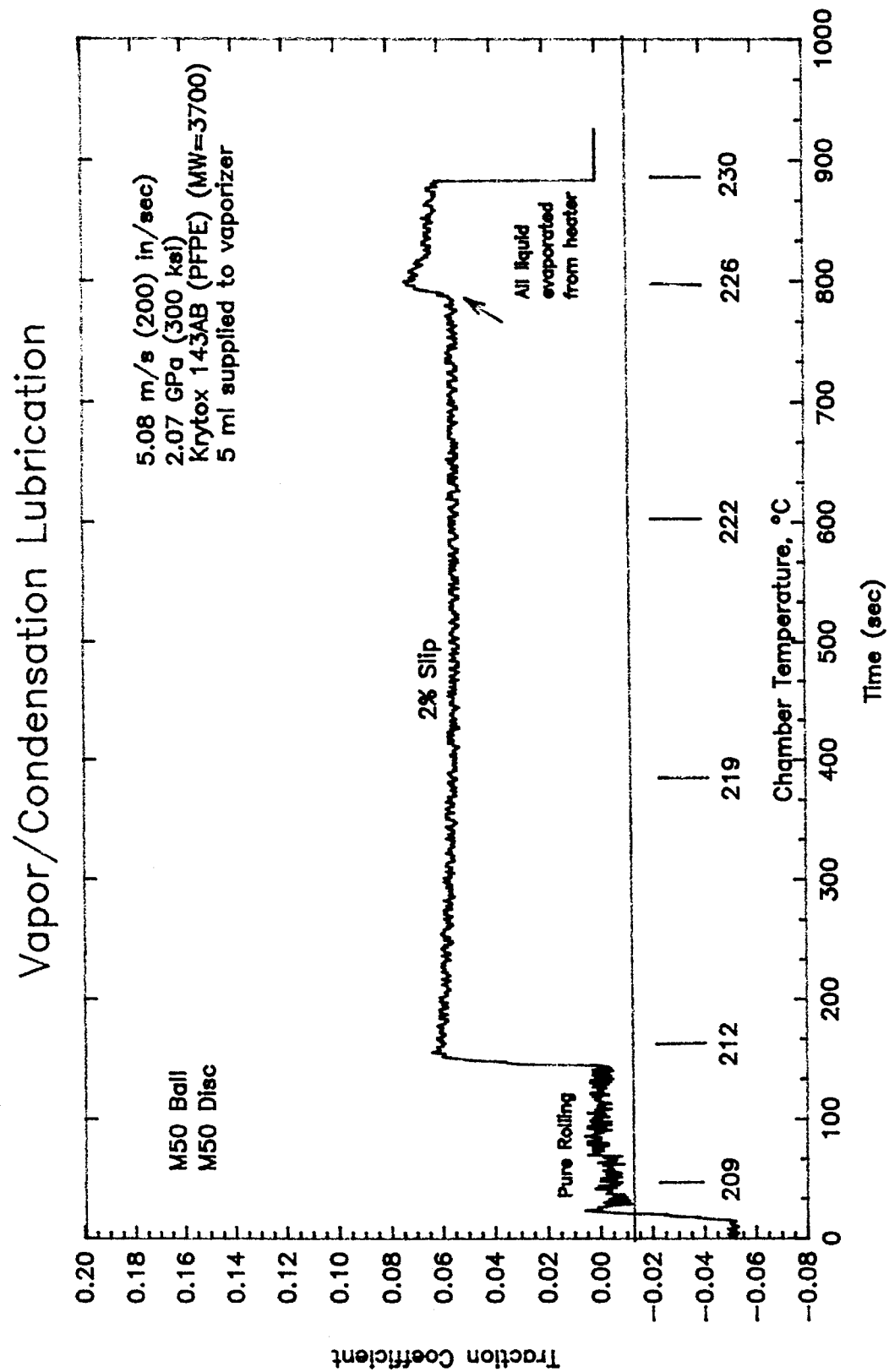
FIG. 10 shows the traction coefficient for a vapor/condensate lubricated contact with a PFPE fluid.

The "heartbeat" of an EHD lubricated contact is reflected in its traction coefficient. It is a helpful quantity that can be used to judge lubrication performance. The traction coefficient for an EHD contact which is separated by a lubricant film is a function of the molecular structure of the lubricant and varies with temperature and pressure. As a reference, the EHD traction vs temperature for a PFPE lubricant conventionally supplied as a liquid is shown in FIG. 9. For the selected stress conditions, the traction decreases almost linearly from 0.11 at 23° C. to 0.03 at 375° C. (The traction coefficient is determined with 2% slip which generates very little heat within the contact. For the selected operating conditions, greater slip will begin to reduce the traction coefficient because of oil film heating and less slip will reduce the traction coefficient because the contact will operate under incipient sliding where less than the full contact area is encountering slip. The 2% traction coefficient can be viewed as the maximum traction coefficient.) Since traction coefficient determines the frictional losses in a contact, which is dissipated as heat, the efficiency of the contact in terms of torque for the raceway contact in a rolling element bearing or power loss for a gear mesh pair increases with temperature. The preferred embodiment of the invention encourages elevated temperature operation for V/C lubrication. FIG. 10 characterizes the traction coefficient with V/C lubrication, whereupon 5 ml of PFPE (molecular weight 3700) is supplied to the vaporizer. The vaporizer temperature is set at 270° C. The vapor that is generated condenses on the test specimen surfaces to provide EHD lubrication. The traction coefficient at 2% slip is on the order of 0.05, which according to FIG. 9, is the expected value for a conventional liquid lubricated at approximately 220° C.

Figure 11:
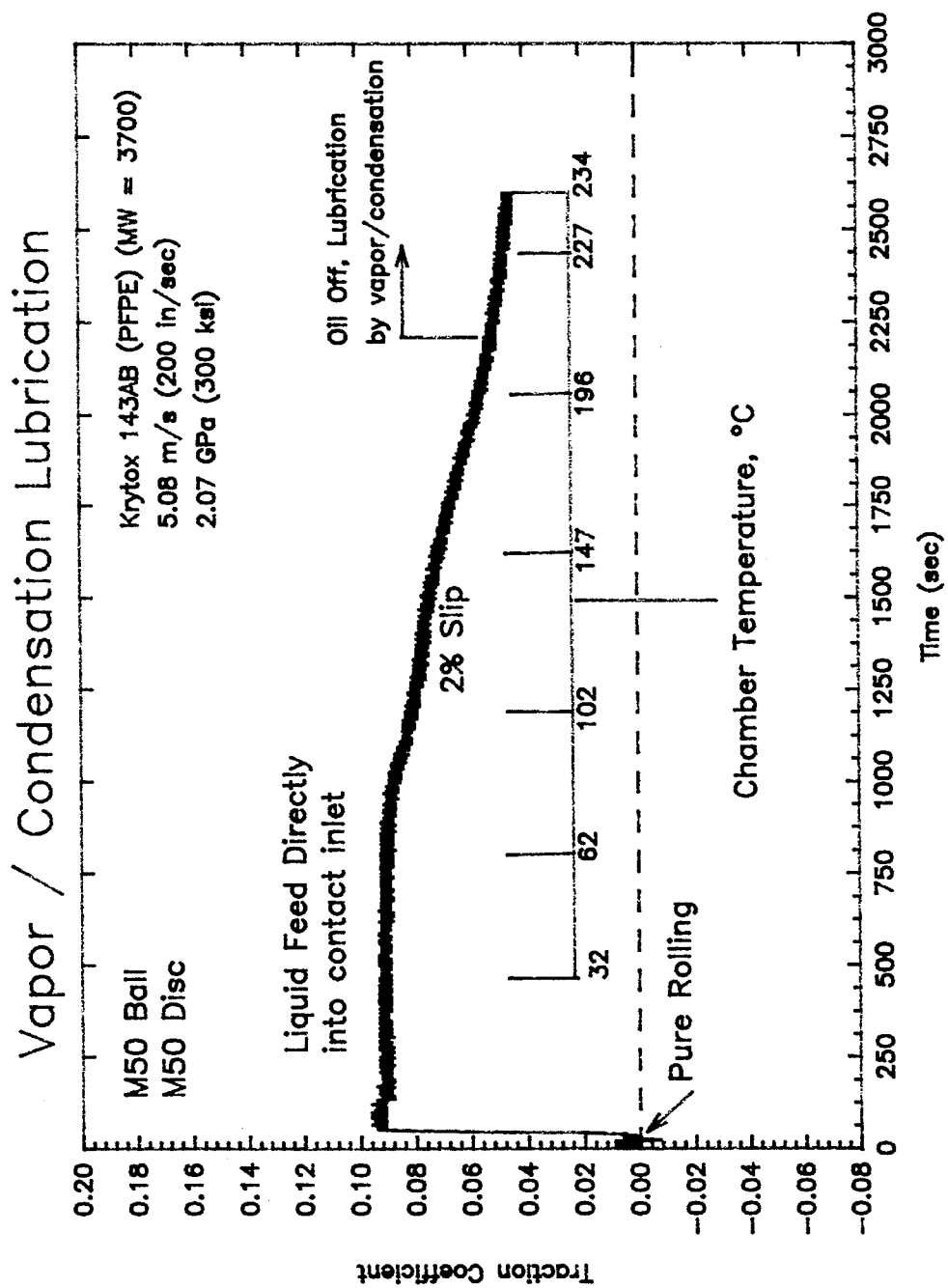
FIG. 11 shows a smooth transition between conventional drip feed lubrication to V/C lubrication.

A transition between conventional liquid lubrication and V/C lubrication is shown in FIG. 11. The traction coefficient drops with temperature. No transition in traction is evident when the liquid oil supply is off and the V/C lubrication system begins to operate. The invention supplies the contact inlet with sufficient condensate to fill the inlet region for EHD lubrication. As far as the EHD contact is concerned its inlet region does not know if its supply or replenishment was transported as a liquid or a vapor. In ether case, the EHD mechanism is operative and no wear is observed on the surfaces.

Figure 12:
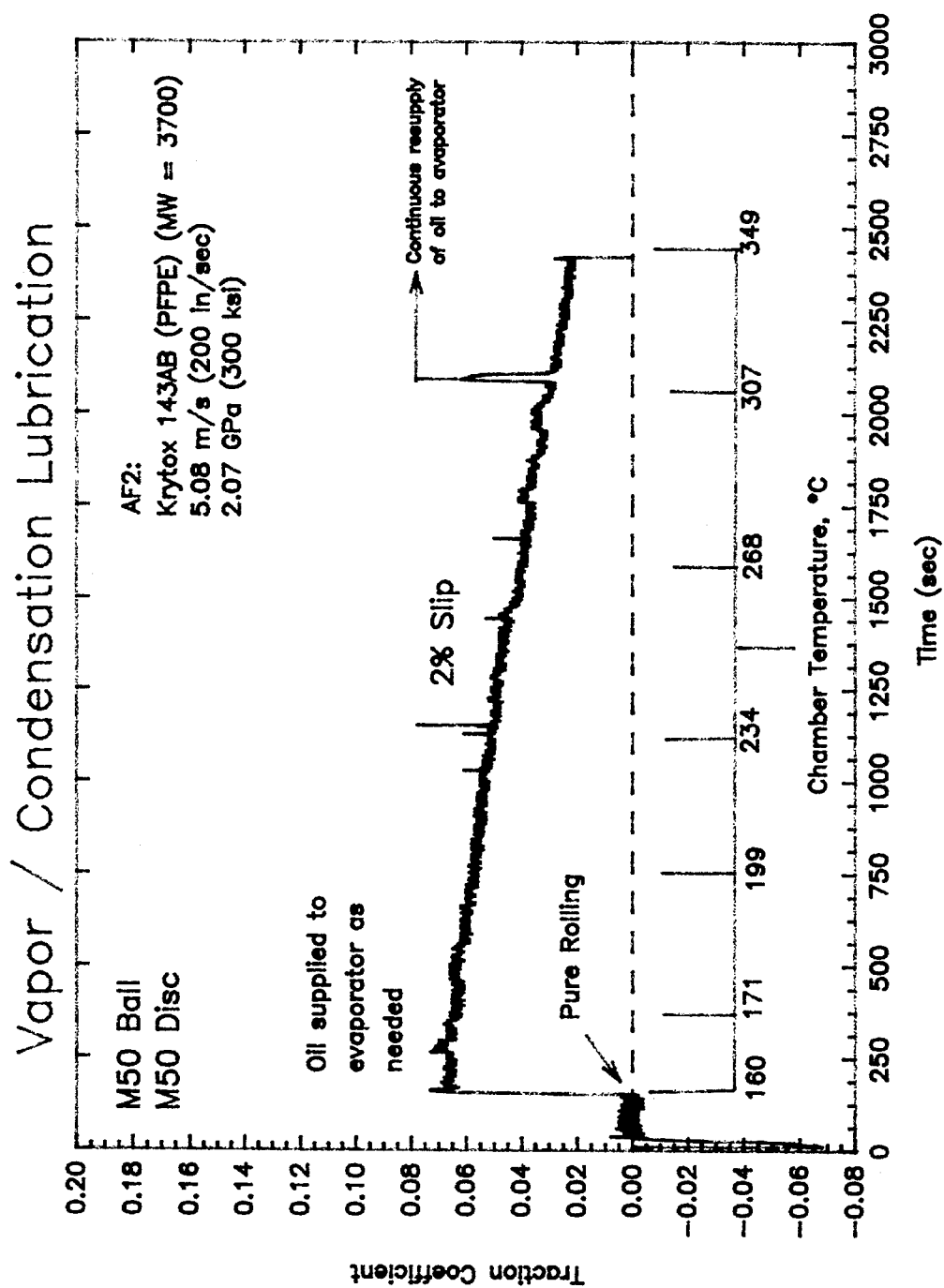
FIG. 12 shows the variation in traction coefficient with temperature for V/C lubrication.

If the surface temperature continues to rise above the vaporization temperature of the selected PFPE, the condensate will evaporate from the surface and the EHD film will become starved. With the loss of a full EHD film the surface will begin to wear. FIG. 12 shows the V/C lubrication traction characteristics for a PFPE with a molecular weight of 3700 which was run above its vaporization temperature. Because the simulator is not a completely closed system, replenishment lubricant is supplied to the vaporizer when needed. The test was conducted to approximately 350° C. Wear of the surface topographical features is an indication of a less than full EHD film. These temperatures begin to initiate a corrosive reaction between the PFPE and the M50 bearing steel specimens. PFPE reactions with iron are well documented in the art of lubrication with this high temperature lubricant. Because of this, the preferred embodiment of the invention utilizes a high temperature bearing steel such as BG42 with a thin dense chrome hardface coating as one of the material pairs with a silicon nitride rolling element for the other material pair. The coating is used to hide the underlying iron. The combination of thin dense chrome and silicon nitride provides a material pair with good material compatibility for wear resistance, polishing wear on a microscale and debris tolerance. The thin dense chrome provides mild reaction with PFPE's at temperatures above 400° C. which actually helps provide a boundary lubricating film. It is known in the art of PFPE lubrication that they have relatively poor boundary lubrication characteristics. At low temperatures they do not readily form a low shear strength boundary film when there is surface interaction. At high temperatures the surface interaction with conventional ferrous base materials become corrosive. With the materials in the preferred embodiment, the PFPE reactions are of the right order of magnitude to provide some boundary lubrication protection at temperatures.

Figure 8:
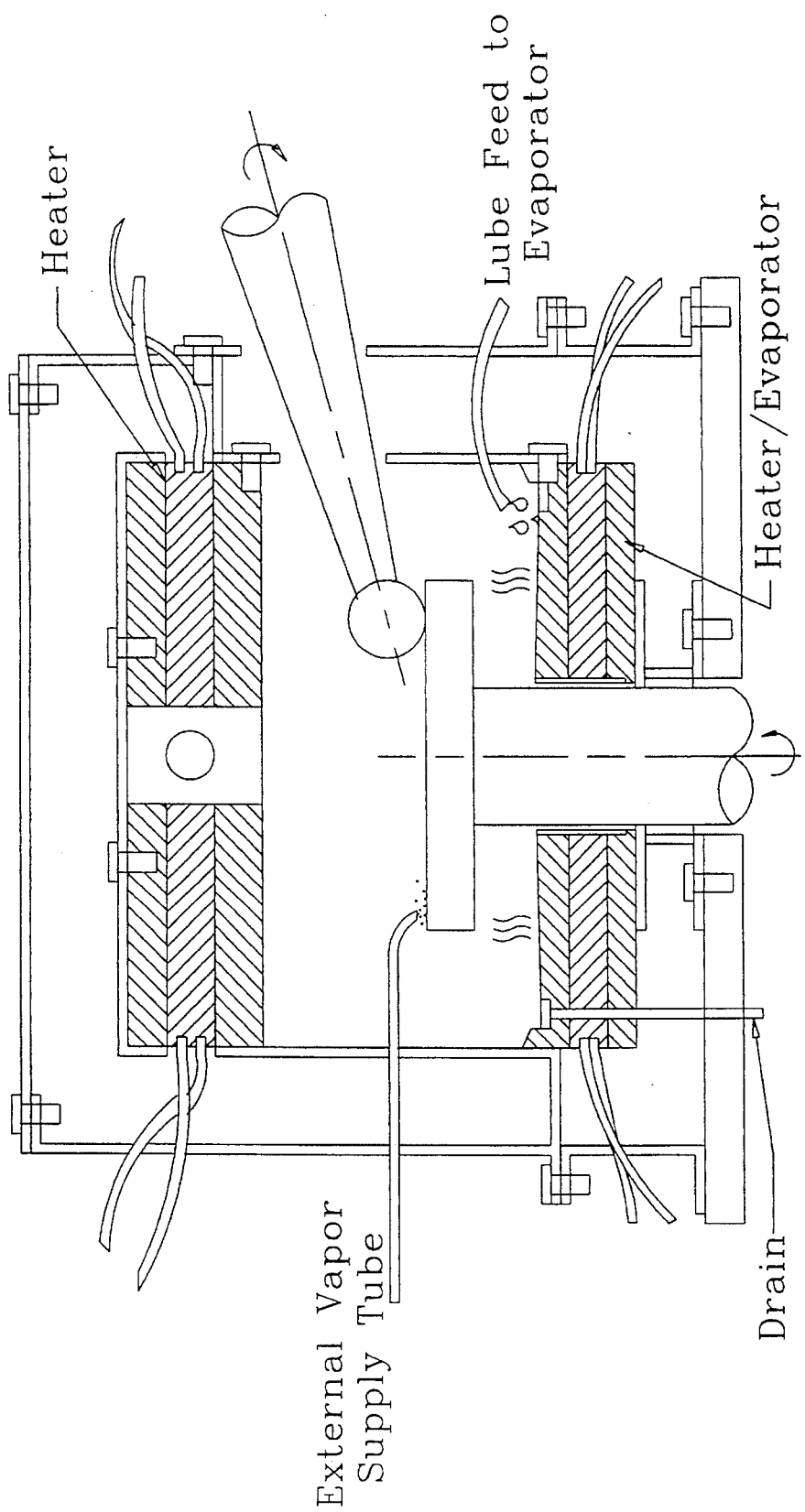
FIG. 8 is a schematic of a single contact simulator for concentrated contacts as found in bearing and gear contact. The simulator provides the characteristics of V/C lubrication.
Figure 13:
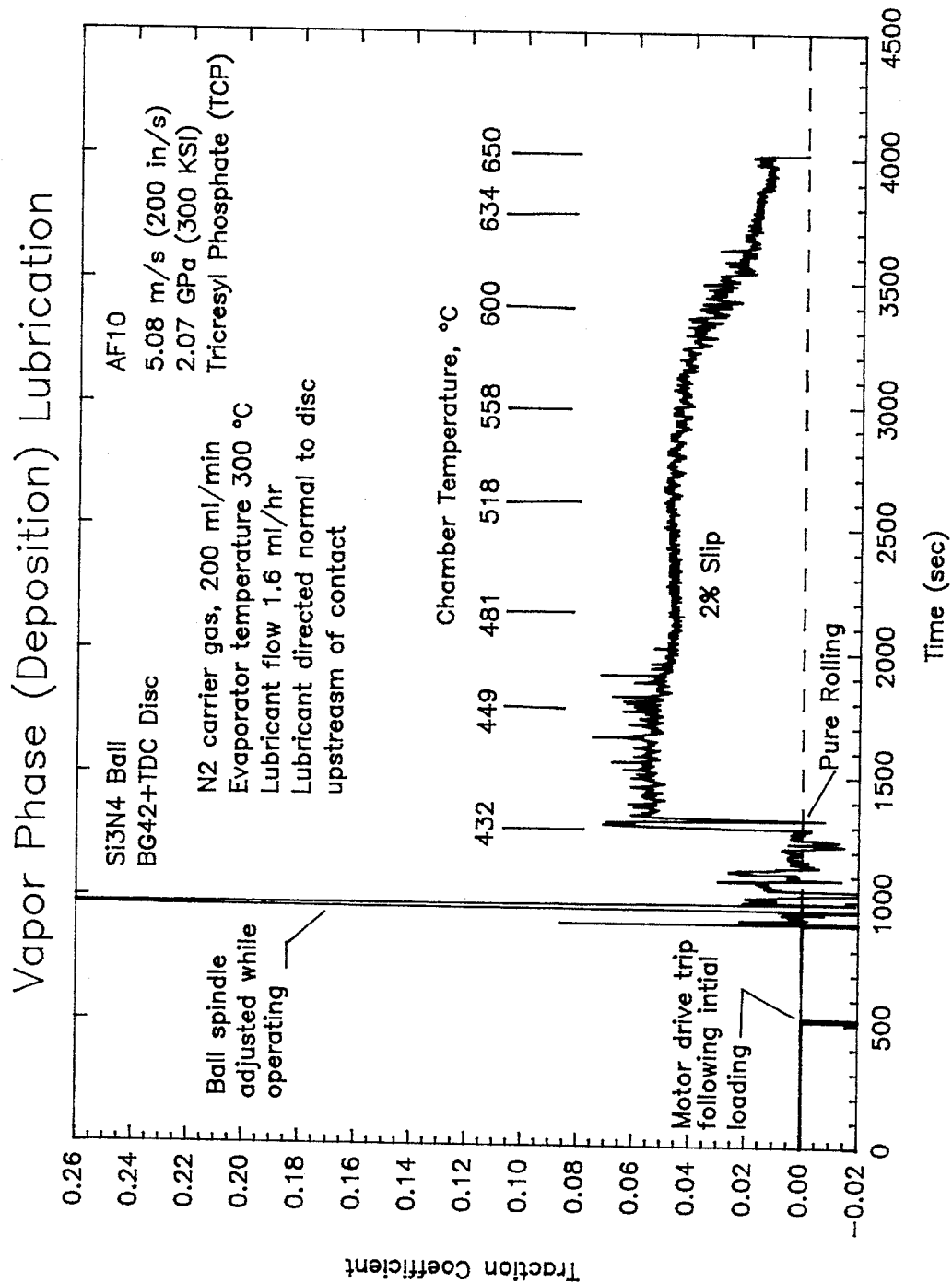
FIG. 13 shows the traction coefficient for vapor/deposition boundary film with tricresyl phosphate.
Figure 14:
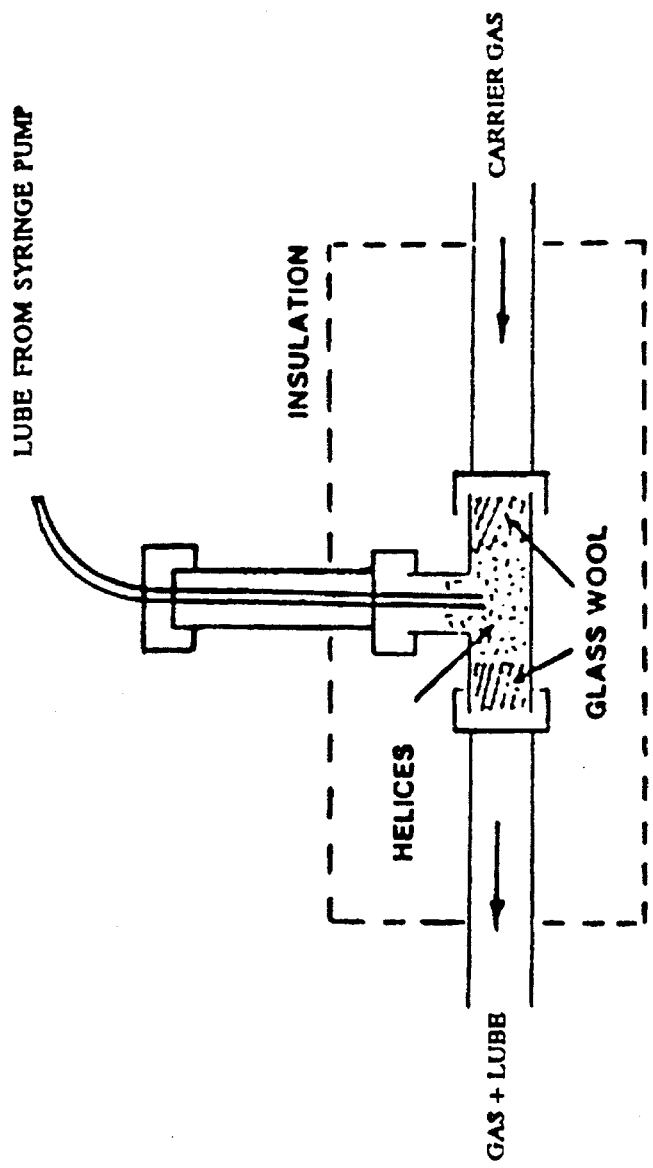
FIG. 14 is a schematic of the external vaporizer used for vapor/deposition lubrication.

Another form of boundary lubrication is provided by vapor/deposition (V/D) lubrication. In the art of V/D lubrication, vapor is supplied to a surface at high temperature and allowed to decompose or react with the surface material to form a boundary film. The process can provide a boundary lubricating film as per E. E. Klaus et al. (U.S. Pat. No. 3,978,908, September 1996). FIG. 13 shows the traction coefficient for a V/D lubricated contact in the test simulator as derived from the art of E. E. Klaus. The V/D vapor is generated external to the lubricated system in an evaporator shown schematically in FIG. 14. The vapor is delivered with a nitrogen carrier gas and impinged upon the thin dense chrome coated disc specimen (the preferred material for V/C lubrication) by way of a supply tube as shown in FIG. 8. Sufficient time and direct impingement of the vapor on the surface is necessary to create a boundary film—a limitation of V/D lubrication relative to the V/C invention described herein. The concentrated contact was lubricated with a boundary film from the decomposition of tricresyl phosphate to a temperature of 650° C. Boundary film lubrication is much less desirable than EHD lubrication because of greater surface interaction, wear and limited life and reliability. Nevertheless, the invention of V/C lubrication allows a transition to V/D lubrication so that the lubrication range can be extended to temperatures above 500° C., at least for short operating times, which is about the limit of the long life and reliable EHD mechanism derived from V/C lubrication with currently available PFPE's.

Figure 15:
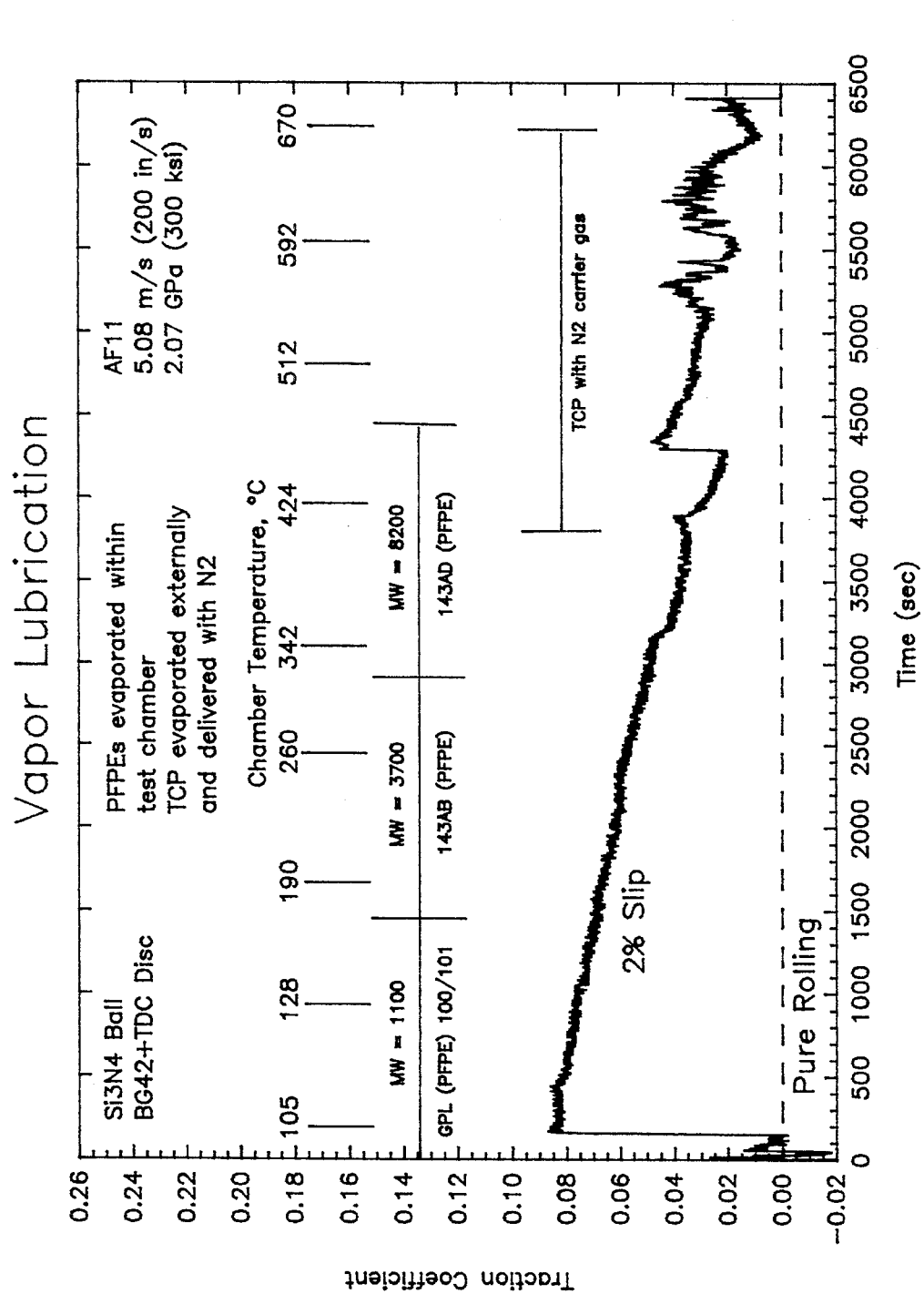
FIG. 15 illustrates the traction coefficient for the broad temperature range V/C lubrication and its extension into V/D lubrication to 670° C.

The broad temperature range lubrication with the V/C lubrication of the invention along with V/D lubrication derived for the art is characterized in the traction vs time plot of FIG. 15. V/C lubrication with an EHD mechanism is provided from 100° C. to over 400° C. with the use of PFPE fluids having three average molecular, weights(1100, 3700 and 8200). The traction coefficient of a full EHD film is reduced from 0.085 at 100° C. to approximately 0.02 at 425° C. The transition from V/C lubrication with an EHD mechanism to V/D lubrication with a tricresyl phosphate boundary film results in greater variation in traction because of the surface interaction with an incomplete boundary film and the onset of wear. This example of continuous lubrication from 100° C. to 670° C. with both EHD and boundary mechanisms which provide low traction coefficient is well beyond current lubrication art.

Figure 16:
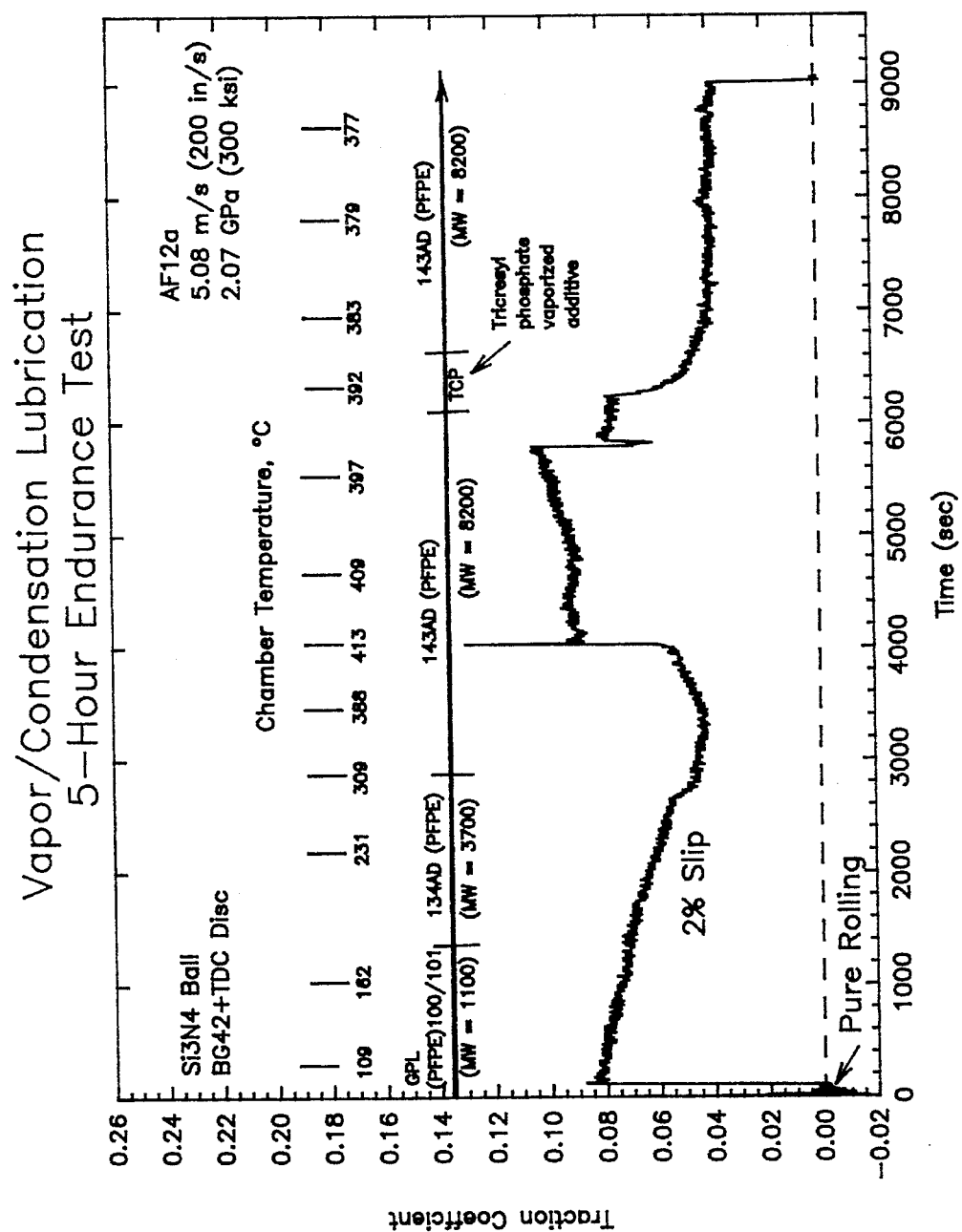
FIG. 16 illustrates the functionality of the boundary additive TCP as delivered as a vapor.

A notable feature in the traction coefficient in FIG. 15 is the slight rise in traction around 424° C. with V/C lubrication. This is the point where $h_m/\sigma$ is expected to be small. The rise in traction was reversed upon the introduction of tricresyl phosphate vapor from an external source. The reduction in traction at that point is attributed to the boundary lubricating film of tricresyl phosphate. The boundary lubricating enhancement of V/C lubrication with PFPE's is shown more dramatically in FIG. 16, where the onset of V/C lubricated surface failure is made to recover by the introduction of tricresyl phosphate vapor for a brief period of time. The tricresyl phosphate, like most other additives, cannot be used in PFPE's with conventional liquid lubrication because of the limited solubility of additives in PFPE's. With the use of vapor delivered lubricants, the invention circumvents the problem of solubility.

Figure 17:
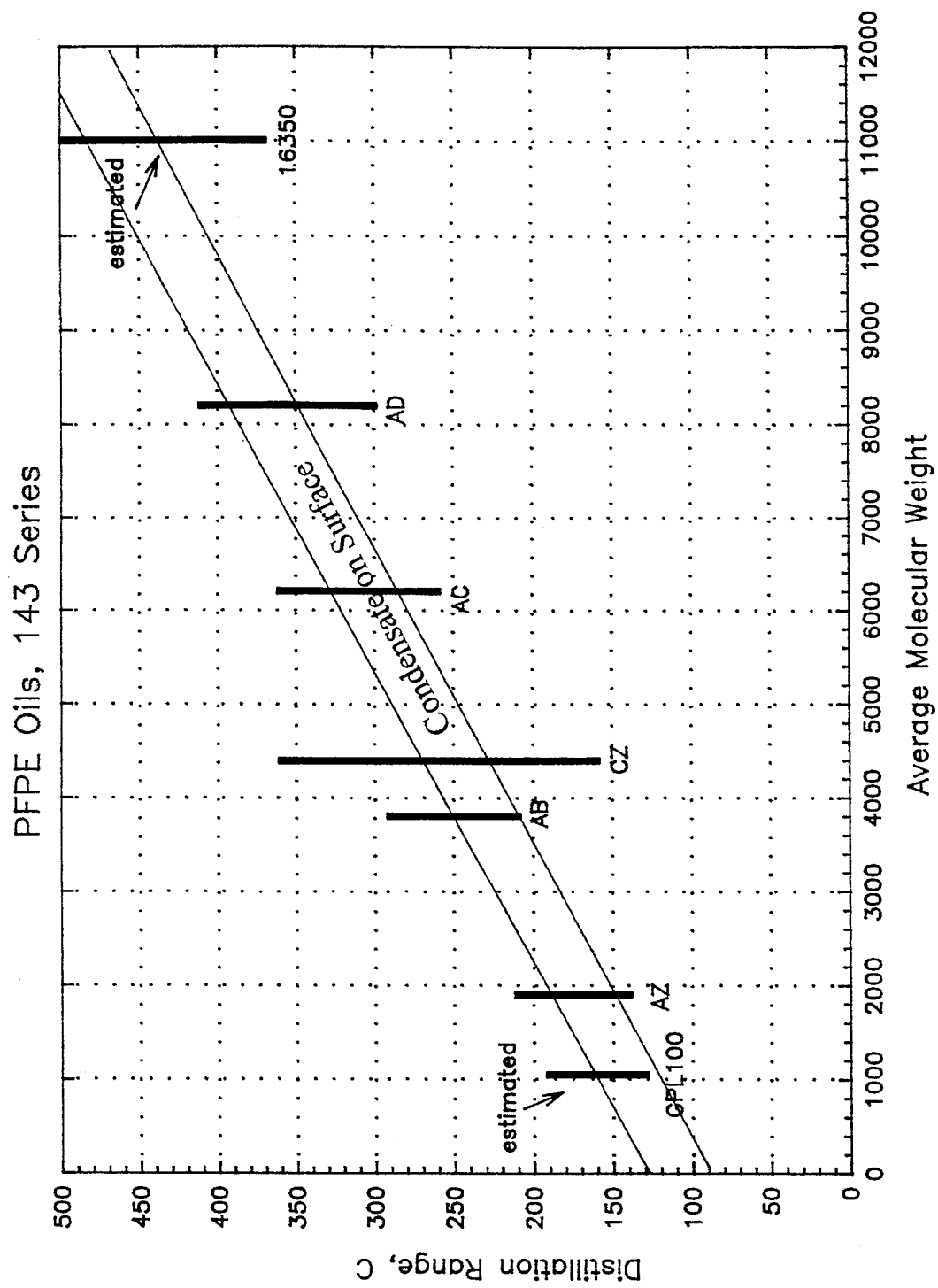
FIG. 17 shows the variation of molecular weight with temperature of the PFPE fluids that resides on the surface.

The V/C lubrication over a temperature range of 100° C. to 424° C., as shown by the invention in FIG. 15, is accomplished with PFPE's having three average molecular weights. The invention can be carried out by blending the fluids into a broad molecular product. From such a single fluid the molecular weight of the vaporized material can be controlled by the temperature of the vaporizer. More importantly, the condensate on the surface to be lubricated is a function of its temperature whereby low surface temperature will allow condensation of both high and low molecular weight species; but high surface temperature will only allow high molecular weight species on the surfaces since low molecular weight materials will evaporate from the hot surface. The invention with V/C lubrication, by a natural vaporization/condensation process, provides a condensate on the surfaces that increases in molecular weight with temperature as shown in FIG. 17. This favorable selection process provides the inlet to the EHD contact with variable viscous properties—a lubrication process we call "variable property" (VP) lubrication. Using the available PFPE products in FIG. 17, the relationship between $h_m/\sigma$ and temperature for the operating conditions used in the test simulator is shown in FIG. 18. The concept of VP lubrication provides the extension of the EHD lubrication mechanism in the pursuit of elevated temperature lubrication.

What is claimed is:

1. A method for the vapor lubrication over a broad range of temperature operation of a non-conforming contacting surface carrying high loads over at least one area of contact, which method comprises:

a. providing a plurality of lubricant materials in condensate state in proximity to said contacting surface, said lubricant materials comprising a blend of materials each having a vaporization temperature within a selective range within the range of temperature operation of the contacting surface, such that the vaporization temperature of the blend is substantially coextensive with the range of temperature operation of the contacting surface, and further characterized in that each lubricant material is itself a fraction of polymers of similar composition and molecular weights, and exhibits the property that its vaporization occurs:

i) without solid decomposition products at temperatures within the range of temperature operation of the contacting surface; and, ii) without reaching an auto ignition temperature within the range of temperature operation of the contacting surface;

b. creating of a lubricating vapor in proximity to said contacting surface from said plurality of lubricating materials by heating said materials to a temperature above the operating temperature of said contacting surface, thereby vaporizing at least one of said plurality of lubricating materials; and, c. condensing a sufficient quantity of said lubricating vapor of at least one lubricant material on the inlet region of said contacting surface, to provide elastohydrodynamic (EHD) lubrication of said contacting surface by the condensation of said lubrication material.

2. The method of vapor lubrication of claim 1, wherein the lubricating materials are selected from the group consisting of mineral oils, synthetic fluids and synthetic solids.

3. The method of vapor lubrication of claim 1, wherein the lubricating materials are perfluoroalkylpolyethers (PFPE's).

4. The method of vapor lubrication of claim 1 wherein the lubrication materials are selected to serve as an elastohydrodynamic lubricant at temperatures up to about three hundred fifty degrees Celsius (350° C.).

5. The method of vapor lubrication of claim 1 wherein the lubrication materials are selected to serve as an elastohydrodynamic lubricant at temperatures up to about five hundred degrees Celsius (500° C.).

6. A method for the vapor lubrication over a broad range of temperature operation of a non-conforming contacting surface carrying high loads over at least one area of contact, which method comprises:
  a. providing a plurality of lubricant materials in condensate state in proximity to a contacting surface, said lubricant materials comprising said blend of materials each having a vaporization temperature within a selective range within the range of temperature operation of the contacting surface, such that the vaporization temperature of the blend is substantially coextensive with the range of temperature operation of the contacting surface, and further characterized in that each lubricant material is itself a fraction of polymers of similar composition and molecular weights, and exhibits the property that its vaporization occurs:
    i) without solid decomposition products at temperatures within the range of temperature operation of the contacting surfaces; and,
    ii) without reaching an auto ignition temperature within the range of temperature operation of the contacting surface;
  b. creating a lubricating vapor in proximity to said contacting surface from said plurality of vapor lubricating materials by heating said materials to a temperature above the operating temperature of said contacting surface, thereby vaporizing at least one of said plurality of vapor lubricating materials;
  c. condensing a sufficient quantity of said lubricating vapor of at least one lubricant material on the inlet region of said contacting surface, to provide elastohydrodynamic (EHD) lubrication of said contacting surface by the condensation of said lubrication material;
  d. further providing a vapor of a phosphate additive to provide enhanced boundary lubrication by vapor deposition.

7. The method of vapor lubrication of claim 6, wherein the lubricating materials are selected from the group consisting of mineral oils, synthetic fluids and synthetic solids.

8. The method of vapor lubrication of claim 6, wherein the lubricating materials are perfluoroalkylpolyethers (PFPE's).

9. The method of vapor lubrication of claim 6, wherein the vapor of a phosphate additive is provided separately.

10. The method of vapor lubrication of claim 6, wherein the phosphate additive is tricresyl phosphate.

11. The method of vapor lubrication of claim 8, wherein the phosphate additive is tricresyl phosphate.

12. The method of vapor lubrication of claim 10 wherein the lubrication materials are selected to serve as an elastohydrodynamic lubricant at temperatures up to about three hundred fifty degrees Celsius (350° C.) with boundary lubrication provided by said tricresyl phosphate above that temperature.

13. The method of vapor lubrication of claim 10 wherein the lubrication materials are selected to serve as an elastohydrodynamic lubricant at temperatures up to about five hundred degrees Celsius (500° C.) with boundary lubrication provided by said tricresyl phosphate above that temperature.

14. The method of vapor lubrication of claim 10 wherein the lubrication materials are selected to serve as an elastohydrodynamic lubricant at temperatures up to about five hundred degrees Celsius (500° C.) with boundary lubrication provided by said tricresyl phosphate up to about six hundred seventy degrees Celsius (670° C.).

15. The method of vapor lubrication of claim 11 wherein the lubrication materials are selected to serve as an elastohydrodynamic lubricant at temperatures up to about three hundred fifty degrees Celsius (350° C.) with boundary lubrication provided by said tricresyl phosphate above that temperature.

16. The method of vapor lubrication of claim 11 wherein the lubrication materials are selected to serve as an elastohydrodynamic lubricant at temperatures up to about five hundred degrees Celsius (500° C.) with boundary lubrication provided by said tricresyl phosphate above that temperature.

17. The method of vapor lubrication of claim 11 wherein the lubrication materials are selected to serve as an elastohydrodynamic lubricant at temperatures up to about five hundred degrees Celsius (500° C.) with boundary lubrication provided by said tricresyl phosphate up to about six hundred seventy degrees Celsius (670° C.).

18. A method for the vapor lubrication over a broad range of temperature operation of a non-conforming contacting surface carrying high loads over at least one area of contact, which method comprises:
  a. preconditioning the contact surface with a vapor of a phosphate additive to provide enhanced boundary lubrication by vapor deposition;
  b. providing a plurality of lubricant materials in condensate state in proximity to said contacting surface, said lubricant materials comprising a blend of materials each having a vaporization temperature within a selective range within the range of temperature operation of the contacting surface, such that the vaporization temperature of the blend is substantially coextensive with the range of temperature operation of the contacting surface, and further characterized in that each lubricant material is itself a fraction of polymers of similar composition and molecular weights, and exhibits the property that its vaporization occurs:
    i) without solid decomposition products at temperatures within the range of temperature operation of the contacting surfaces; and,
    ii) without reaching an auto ignition temperature within the range of temperature operation of the contacting surface;
  c. creating a lubricating vapor in proximity to said contacting surface from said plurality of vapor lubricating materials by heating said materials to a temperature above the operating temperature of said contacting surface, thereby vaporizing at least one of said plurality of vapor lubricating materials;

d. condensing sufficient quantity of said lubricating vapor of at least one lubricant material on the inlet region of said contacting surface, to provide elastohydrodynamic (EHD) lubrication of said contacting surface by the condensation of said lubrication material;

e. further providing a vapor of a phosphate additive to provide enhanced boundary lubrication by vapor deposition.

19. The method of vapor lubrication of claim 18, wherein the lubricating materials are perfluoroalkylpolyethers (PFPE's).

20. The method of vapor lubrication of claim 18, wherein the phosphate additive is tricresyl phosphate.

* * * * *